Jan. 24, 1967 C. I. BOKSJÖ 3,300,684
MERCURY ARC RECTIFIER FOR CURRENT CONVERTER
Filed June 1, 1964
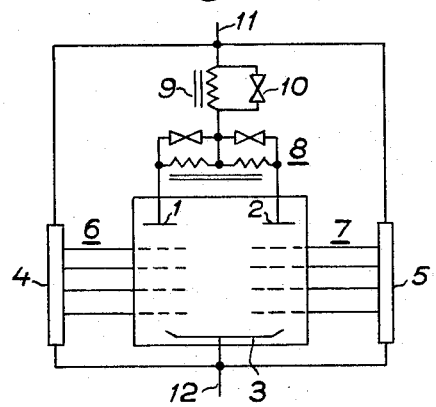
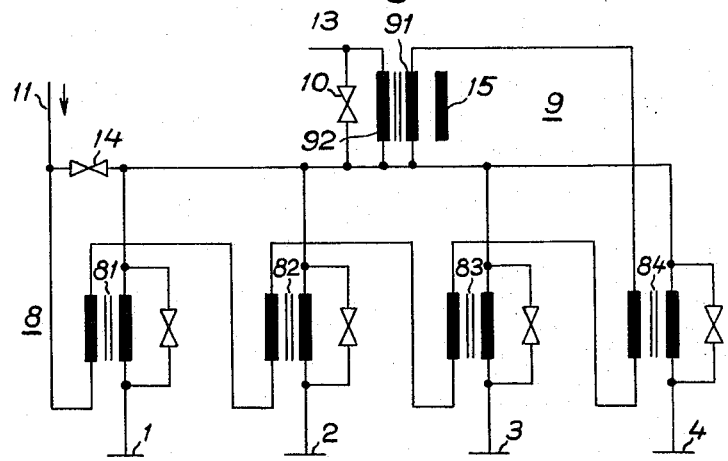
INVENTOR.
CARL INGVAR BOKSJÖ

3,300,684
MERCURY ARC RECTIFIER FOR CURRENT CONVERTER
Carl Ingvar Boksjö, Ludvika, Sweden, assignor to Allmanna Svenska Elektriska Aktiebolaget, Vasteras, Sweden, a Swedish corporation
Filed June 1, 1964, Ser. No. 371,708
Claims priority, application Sweden, June 11, 1963, 64,117/63
8 Claims. (Cl. 315—323)

The present invention relates to a mercury arc rectifier for a current converter for high voltage, which rectifier comprises several parallel discharge paths connected by means of a current divider and the invention aims at an improvement of the ignition conditions in such a rectifier, particularly in those cases when the mercury arc rectifier must be ignited at relatively low voltage.

Such is the case, for example, with by-pass rectifiers in converter stations having several constituent converters. In such stations it is normal that the different constituent converters are provided with individual by-pass rectifiers and short-circuiting means for these, for example in the form of an isolator. The by-pass rectifier usually has the same design as the ordinary operating rectifiers in the constituent converter and similarly is provided with a number of intermediate electrodes connected to a voltage divider inserted between the anode and cathode of the rectifier. When such a constituent converter is to be put into operation said short-circuiting device is opened and thus an arc is formed and the voltage drop over this arc is used to ignite the by-pass rectifier and to transfer the current to this. When this has taken place said short-circuiting device is completely opened and the rectifiers in the constituent converter are unblocked, whereby the current from the by-pass rectifier commutates to the operating rectifiers of the constituent converter. In comparison with the operating rectifiers, therefore, the by-pass rectifier will in this case ignite with a relatively low voltage, i.e., only that corresponding to the arc voltage drop in the short-circuiting means. The ignition of a by-pass rectifier can therefore give rise to certain difficulties and these are particularly noticeable in a by-pass rectifier comprising several parallel discharge paths. Even if such parallel discharge paths are connected together with a current divider, in any case only the discharge path first ignited will receive full ignition voltage while the subsequently ignited discharge paths have until now had to ignite with reduced voltage. An attempt has been made to improve the ignition conditions in a by-pass rectifier by delaying the ignition impulse to the rectifier grid until the short-circuiting means has opened so much that it may be assumed that the arc voltage will be sufficient to ensure ignition of the rectifier even when this comprises several parallel discharge paths. However, such a precaution causes extremely serious burning of the contact parts of the short-circuiting means thus considerably shortening their life.

Similar difficulties arise when a rectifier group is taken out of operation in which case the anode of the by-pass rectifier has negative potential when the grid receives an ignition impulse.

Another situation where a rectifier may ignite with low voltage arises when rectifier equipment is operated with highest E.M.F., i.e., with a small delay angle. At maximum E.M.F., i.e., corresponding to delay angle zero the commutation voltage is equal to zero at the moment of ignition so that it may be difficult to make all parallel discharge paths ignite within a reasonable time.

A substantial improvement of the ignition conditions in the later igniting discharge paths in a mercury arc rectifier of the type under discussion is obtained by means of the present invention which is based on the principle of increasing the voltage across the individual voltage dividers in relation to the voltage across the corresponding discharge paths, this being achieved with the help of an inductive means in series with the parallel discharge paths. The current building up in the discharge path first ignited will induce a voltage in said means and the voltage dividers are connected to this voltage in series with the voltage across the discharge paths.

Said means may simply consist of a reactor having an iron core. Even better conditions are achived, however, if such a reactor is provided with a secondary winding, the voltage dividers being connected to this winding in series with the discharge paths.

The invention will be further described with reference to the accompany drawing in which FIGURES 1 and 2 show two different rectifier connections having several parallel discharge paths.

FIGURE 1 shows a rectifier connection inserted between two supply conductors 11 and 12. The rectifier comprises two anodes 1 and 2 having a common cathode 3. Together with the two anodes a number of intermediate electrodes 6 and 7, respectively, are provided which are connected to the voltage dividers 4 and 5, respectively. In series with the rectifier a reactor 9 is connected, having an iron core and parallel-connected with a voltage-dependent resistor 10, a so-called varistor. The voltage dividers 4 and 5 are connected to the supply conductors 11 and 12 in such a way that they lie parallel both to said reactor 9 and the rectifier. Further, the two anodes are connected together by means of a so-called current divider 8. When such a rectifier is ignited, one of the discharge paths will always ignite before the others and the purpose of the current divider is to allow the current building up in the first igniting discharge path to induce a voltage so high and so sustained that it is sufficient to ignite the remaining discharge path or paths. With normally operating rectifiers this induced voltage from the current distributor together with the power already stored in the voltage dividers of the rectifier is usually sufficient to ignite the remaining discharge paths, but with a by-pass rectifier the resultant voltage is often too low for this and the same is true in the other cases mentioned. Due to the insertion of the reactor 9, however, the current building up in the first igniting discharge path will give rise to a counter-voltage in the reactor which is added to the voltage drop across the rectifier and the voltage induced in the current divider. Thus the voltage divider for the later igniting discharge path will receive the whole total voltage and by a suitable dimensioning of the reactor 9 it will be possible to obtain a sufficiently high voltage between the cathode 3 and the intermediate electrodes of the latter igniting discharge path. In this way it is possible to ensure discharging in the lower part of the rectifier and the voltage induced in the current divider therefore need only accomplish ignition from the uppermost intermediate electrode up to the anode, which does not give rise to any great difficulties.

Since the reactor 9 is parallel-connected to the varistor 10 there is a longer time when the voltage drop across the reactor 9 can be utilized.

In FIGURE 2 a second embodiment according to the invention has been shown, where only the anode supply conductor 11, the current divider 8 and anodes 1–4 and the reactor 9 with varistor 10 have been included while the cathode, voltage dividers and intermediate electrodes have been excluded. The voltage dividers are here not connected directly to the anode supply conductor 11, but instead to a terminal 13 on the reactor 9 which has been in this case designed as a transformer having primary winding 91 and secondary winding 92. The rectifier connection comprises in this case four parallel discharge paths, each having its own anode 1-4. The current divider is designed as four transformers 81-84, the secondary windings of which are connected in series with one each of the anodes 21-24 while all the primary windings are connected in series between the anode supply conductor 11 and the reactor 9. Further, each secondary winding in the transformers 81-84 is parallel-connected with a varistor. This known type of current distributor operates in the following manner: the current building up in the first igniting discharge path flows through the primary windings of all the transformers and thus induces voltages in their secondary windings which help to ignite the remaining discharge paths. The conversion ratio in the four transformers in the current distributor is here 1:4 and a balance is therefore obtained when all the discharge paths have been ignited. The purpose of the varistors lying parallel to the secondary sides of the transformers is to lengthen the time for the voltage impulse and thus improve the certainty of ignition in the later igniting discharge paths.

As shown the reactor 9 is designed as a transformer the conversion ratio 92:91 of which is greater than one. The discharge current building in the first igniting discharge path will therefore flow through the primary winding 91 and induce a voltage in the secondary winding 92 which is added to the current divider voltage so that the voltage across the voltage dividers is increased. By means of a suitable conversion ratio in the transformer 9, therefore, sufficient voltage can be ensured from the voltage divider to initiate discharging from cathode to intermediate electrodes in the later igniting discharge paths and the transformer connection enables the readily ignited anodes to be given even better ignition conditions than the first igniting anode. The varistor 10 has the same function as the varistors in the current divider, i.e., to lengthen the voltage impulse from the transformer 9.

In order to protect the series-connected primary windings against over-voltages a varistor 14 has been inserted parallel to these windings.

In FIGURES 1 and 2 the reactor has been shown connected to the anode side. However, there is nothing to prevent it from being connected to the cathode side. A reactor designed as a transformer has the advantage that the reactor may be provided with a bias winding 15 to counteract the D.C. magnetization caused by the anode current. If the reactor is arranged on the cathode side such a bias winding can be very easily fed from the auxiliary power system of the rectifier connection.

I claim:
1. Mercury arc rectifier for a current converter, said rectifier comprising a number of discharge paths, a current divider connecting said discharge paths in parallel, each discharge path being provided with a number of intermediate electrodes and a voltage divider connected to said intermediate electrodes; inductive means connected in series with said parallel connected discharge paths and said current divider; said voltage divider being connected in parallel with said inductive means, said current divider and said discharge paths.
2. Mercury arc rectifier as claimed in claim 1; said inductive means comprising a reactor.
3. Mercury arc rectifier as claimed in claim 2; said reactor being connected in parallel with a voltage dependent resistor.
4. Mercury arc rectifier as claimed in claim 2; said reactor being provided with an iron core.
5. Mercury arc rectifier as claimed in claim 2; said inductive means comprising a reactor provided with a secondary winding; said voltage dividers being connected in series with said secondary winding.
6. Mercury arc rectifier as claimed in claim 5, said reactor being provided with an iron core.
7. Mercury arc rectifier as claimed in claim 5, said secondary winding being connected in parallel with a resistor.
8. Mercury arc rectifier as claimed in claim 5, said reactor having a bias winding.

References Cited by the Examiner
UNITED STATES PATENTS

| | | | |
|---|---|---|---|
| 2,119,865 | 6/1938 | Lamm | 315—262 X |
| 2,194,308 | 3/1940 | Krines | 321—38 X |
| 2,497,166 | 2/1950 | Goldberg et al. | 315—252 X |

FOREIGN PATENTS

| | | |
|---|---|---|
| 431,762 | 4/1934 | Great Britain. |
| 84,570 | 3/1958 | Norway. |

JOHN W. HUCKERT, *Primary Examiner.*
A. J. JAMES, *Assistant Examiner.*